Nov. 11, 1969 R. H. SUMPTER 3,477,295

PRESSURE TRANSDUCER

Filed June 12, 1967

INVENTOR.
RUDOLPH H. SUMPTER

H. H. Fosche
Paul S. Collignon
Attorneys 3,477,295

PRESSURE TRANSDUCER

Rudolph H. Sumpter, Lancaster, Calif., assignor, by mesne assignments, to the United States of America as represented by the Secretary of the Navy Filed June 12, 1967, Ser. No. 645,552
Int. Cl. G01f *23/14*
U.S. Cl. 73—398 4 Claims

ABSTRACT OF THE DISCLOSURE

A pressure transducer having a semiconductor strain sensor attached to a bendable beam and having a diaphragm actuated cam for flexing said beam. A second sensor is provided within the transducer housing and the two sensors are connected in a Wheatstone bridge circuit to determine the amount of bending.

Background of the invention

The present invention relates to a pressure transducer and more particularly to a pressure transducer having a diaphragm which causes a beam to be flexed. A semiconductor strain sensor is attached to the flexible beam and flexure causes a change in resistance which is proportional to the movement of the diaphragm.

It is well-known to employ strain-sensitive devices for measuring pressure, and it is conventional to employ an element which reflects under applied pressure and to translate this deflection by stress-strain relationships into pressure information. One such device is shown and described in U.S. Patent 3,161,061, entitled, "Strain Gauge Mounting," which issued Dec. 15, 1964, to John E. Ames, Jr. In this patented device, a capsule housing is closed by a back plate which is bolted to a cylindrical portion of the capsule and a sensor assembly is mounted upon this back plate within the capsule housing. The sensor assembly includes a beam having a central portion of reduced cross-section upon which is mounted a sensor. One end of the beam is fixed and the other end is free for deflection in accordance with deflection of a diaphragm, so as to stress the sensor to produce electrical signals related to the applied stress. A force link extends along the axis of the capsule between the diaphragm and the free end of the beam to transmit diaphragm deflection to the beam.

While many heretofore known pressure transducers are of similar construction in that they employ a strain sensor in a Wheatstone bridge circuit, they have a common fault in that limiting stops are not provided and any overpressure beyond about twenty percent of rated range will tear the bridge circuit wires loose and ruin the transducer. For example, in high altitude vent and pressure test flights, a transducer may be set up and calibrated for low pressure readings of 0.5 to 2.0 p.s.i., and the relatively heavy pressures of low altitude flying plus the normal buffet and pressure surges of going through Mach 1 will destroy the transducer before the aircraft gets to mission altitude and speed.

Summary of the invention

The present invention relates to an improved transducer that is rugged and which can still function correctly after being subjected to a very overload. A cam is slidably mounted within a transducer housing and one end of the cam is attached to a diaphragm. The cam is limited in its longitudinal travel by stops on each end. A pair of opposed tapered surfaces are provided on the cam and these engage with a cylindrical end of a bending beam that has its other end stationarily fixed. Movement of the cam is a longitudinal direction causes the bending beam to be flexed. A semiconductor strain sensor is attached to the bending beam for converting the bending movement into an electrical signal.

It is therefore a general object of the present invention to provide a rugged pressure transducer that can be subjected to overpressure without damage to the internal mechanism.

Other objects and advantages of the present invention will be readily appreciated as the same becomes better understood by reference to the following detailed description when considered in connection with the accompanying drawing.

Description of the preferred embodiment

Figure 1:
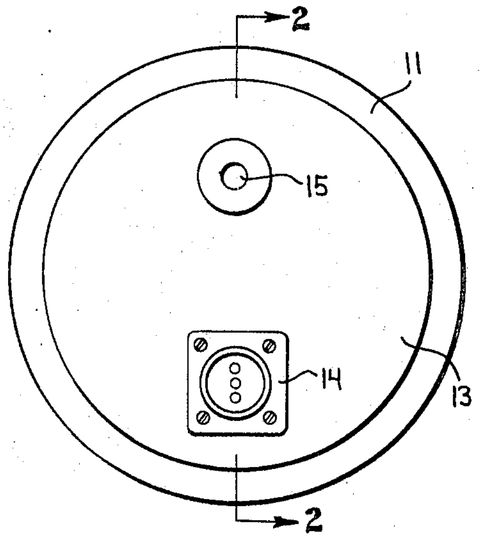
FIGURE 1 is an end view of a preferred embodiment of the present invention.

Referring now to the drawing, there is shown a transducer housing 11 that has one end closed by a diaphragm 12 and the other end closed by an end cap 13. End cap 13 is provided with a suitable connector 14, and also an inlet 15 is provided to receive fluid as a pressure reference. Two inner flanges 16 and 17 are provided on housing 11 and a cam element 18 is longitudinally slidable in flanges 16 and 17. One end of cam element 18 is fastened to diaphragm 12 and movement of diaphragm 12 causes a corresponding movement of cam element 18.

Figure 3:
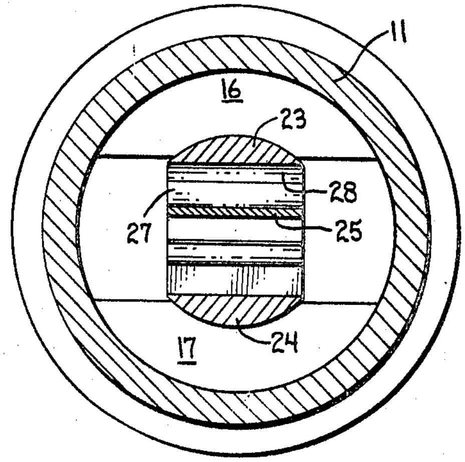
FIGURE 3 is a sectional view taken on line 3—3 of FIGURE 2.
Figure 2:
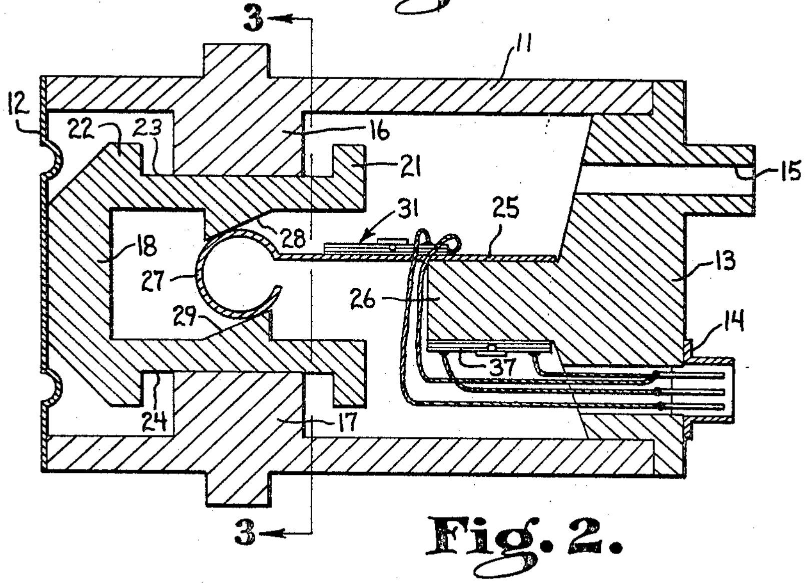
FIGURE 2 is a sectional view taken on line 2—2 of FIGURE 1.

As shown in FIGURES 2 and 3 of the drawing, cam element 18 has outwardly extending flanges 21 and 22 that restrict longitudinal movement. Between flanges 21 and 22, there are provided top and bottom arcuated sections 23 and 24 that slidably fit into inner flanges 16 and 17, respectively. With diaphragm 12 removed, cam element 18 can be rotated ninety degrees and can be removed from housing 11. Likewise, when assemblying the transductor elements, cam element 18 is turned sideways so that flange 21 will pass between the two inner flanges 16 and 17 and once flange 21 has cleared the two inner flanges, cam element 18 is rotated ninety degrees thereby positioning flanges 21 and 22 in line with inner flanges 16 and 17 so that flanges 21 and 22 serve as stops to limit travel of cam element 18.

A bending beam 25 of spring steel is provided within housing 11 and has one end stationarily fixed to platform 26 which is integral with end cap 13. The other end of beam 25 is formed in a cylindrical shape 27 and is engaged by a top inclined surface 28 and a bottom inclined surface 29 on cam element 18. It can be seen that when cam element 18 moves inwardly, inclined surface 28 causes beam 25 to bend downwardly and, likewise, when cam element 18 moves outwardly, beam 25 is bent upwardly.

Figure 4:
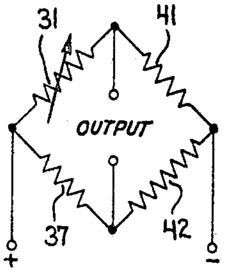
FIGURE 4 is a schematic view of a bridge configuration used in the present invention.
Figure 5:
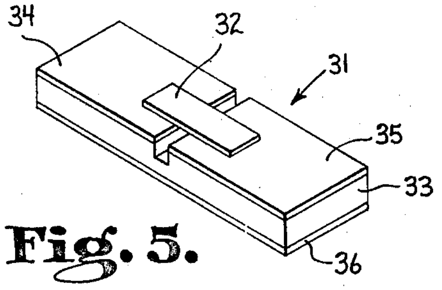
FIGURE 5 is an enlarged perspective view of a semiconductor strain sensor.

Referring now to FIGURES 2, 4, and 5 of the drawing, a semiconductor strain sensor 31 is attached to bending beam 25 for converting the movement of beam 25 into an electrical signal. By way of example, the strain sensor 31 might be of the type manufactured by the Endevco Corporation, Pasadena, California, under the name "Pixie" transducer. The "Pixie" transducer is a resistor that changes value with applied force or deflection, and the principle of operation is similar to that of a strain gage. As shown in FIGURE 5 of the drawing, a "Pixie" transducer is comprised of a semiconductor element 32 which is mounted to a small beam 33. Terminals 34 and 35 are provided and a third terminal 36 is jumpered across the end to terminal 34. Deflection of beam 33 causes element 32 to change its length thereby causing a variance in resistance in accordance with the deflection of the beam. If a current is passed through element 32, this current is modulated by the changing resistances. In order to minimize the effect of temperature change, a second "Pixie" transducer 37 is provided within housing 11 and the two "Pixie" transducers are placed back to back forming a half-bridge, as shown in FIGURE 4 of the drawing. Two additional resistors 41 and 42 are provided and these can be positioned either within or without housing 11, and connected to transducers 31 and 37 in a Wheatstone bridge circuit arrangement.

Operation

In operation, the transducer of the present invention can be used either as a differential pressure measurement or as an absolute pressure measurement. Considering first the use as a differential pressure device, the transducer housing 11 is installed in a separate housing (not shown) so that a pressure P1 is directed against diaphragm 12. Inlet 15 is connected to a pressure area to be compared (P2). With P1 being equal to P2, cam element 18 is centered between stops 21 and 22, and there is no output of the bridge circuit as the circuit is in balance. Assuming now that P1 is increased so that now P1>P2, diaphragm 12 moves cam element 18 inwardly thereby causing beam 25, and also beam 33, which is attached thereto, to deflect downwardly. The resistance of semiconductor element 32 increases which, in turn, causes a voltage output at the bridge. This voltage output is proportional to the movement of cam element 18. Likewise, when P2>P1, diaphragm 12 moves outwardly thereby causing beam 25 to deflect upwardly, and also beam 33 which is fastened to beam 25, and there is a decrease in resistance of element 32.

Considering now the situation where the transducer of the present invention is used as an absolute pressure transducer, the operation is the same except housing 11 is filled with an inert gas and inlet 15 is sealed. Thus the reference side would be sealed at some desired standard pressure.

In the event of heavy pressures which might result, for example, from an aircraft going through Mach 1, flanges 21 and 22 limit the amount of travel of cam element 18 and prevent damage to the diaphragm 12, spring 25, and element 31. Thus, a transducer built according to the teachings of the present invention can be subjected to a very high overload pressure and when the pressure returns to normal, the transducer will provide an accurate output.

I claim:

1. A pressure transducer comprising:
a housing,
a diaphragm closing one end of said housing,
a cam element attached to said diaphragm and slidably mounted in said housing, said cam element having first and second oppositely disposed inclined surfaces, and having stop means for limiting the movement of said cam element,
a flexible beam having one end stationarily mounted and the other end engaging said first and second oppositely disposed inclined surfaces, and
a semiconductor strain sensor attached to said flexible beam, said semiconductor strain sensor being arranged to undergo a variance in resistance proportional to the deflection of said beam.

2. A pressure transducer as set forth in claim 1 wherein said end of said flexible beam engaging said first and second oppositely disposed inclined surfaces is cylindrical shaped.

3. A pressure transducer as set forth in claim 1 having a Wheatstone bridge and wherein said semiconductor strain sensor is disposed in one arm of said bridge.

4. A pressure transducer as set forth in claim 1 having a Wheatstone bridge and wherein a second semiconductor strain sensor is stationarily attached to said housing, said first and second semiconductor strain sensors being disposed as two arms of said bridge in back to back relationship to minimize the effect of temperature change.

References Cited

UNITED STATES PATENTS

| | | | |
|---|---|---|---|
| 2,546,155 | 3/1951 | Haber et al. ------ | 73—88.5 XR |
| 3,074,175 | 1/1963 | Ludlam --------- | 73—88.5 XR |
| 3,161,061 | 12/1964 | Ames -------------- | 73—398 |
| 3,303,451 | 2/1967 | Yuan ------------- | 73—398 XR |

FOREIGN PATENTS

| | | |
|---|---|---|
| 158,684 | 1963 | U.S.S.R. |

CHARLES A. RUEHL, Primary Examiner

U.S. Cl. X.R.

73—88.5